United States Patent Office

2,832,809
Patented Apr. 29, 1958

2,832,809

DICHLORO DERIVATIVES OF CONJUGATED DIENE DIMERS AND THEIR PREPARATION

Charles E. Frank and Irving L. Mador, Cincinnati, Ohio, assignors to National Distillers and Chemical Corporation No Drawing. Application April 4, 1955
Serial No. 499,234

15 Claims. (Cl. 260—654)

The present invention relates to a process for preparation of novel derivatives of conjugated dienes and, more particularly, to the preparation of novel unsaturated dichloro derivatives of conjugated diene dimers. More specifically, the invention relates to a process for reaction of butadiene to produce novel unsaturated dichloro derivatives of dimerized butadiene.

The invention is based on the discovery that a conjugated diene may be subjected to reaction in the presence of a free radical, chloride anions and a suitable solvent under conditions to produce a mixture containing dichloro unsaturated products corresponding to the addition of two chlorine atoms to two units of the diene. In illustration, and by use of butadiene as the conjugated diene, butadiene may be reacted in the presence of a free radical, a suitable solvent which solubilizes the diene, and chloride anions under conditions whereby a reaction mixture is produced that contains an unsaturated dichloro derivative corresponding to the product of addition of two chlorine atoms to two butadiene units.

In a specific embodiment, a conjugated diene such as butadiene is subjected to reaction, in the presence of a free radical source, a suitable solvent, such as a ketone, and chloride anions under reaction conditions, as described hereinafter, whereby butadiene has been found to undergo conversion to desired dichloro unsaturated derivatives as aforesaid.

For providing the free radical in the reaction system, a suitable method involves the use of a peroxide, such as hydrogen peroxide, for oxidation-reduction reaction with a suitable reductant metal salt in aqueous solution whereby liberation of a free radical occurs. In illustration, a suitable method for provision of such a free radical is the use of hydrogen peroxide and a water-soluble salt such as ferrous chloride, titanous chloride, and the like, and which undergoes oxidation-reduction reaction as indicated by the following when a ferrous salt is used, to form a free radical:

$$HOOH + Fe^{+2} \rightarrow Fe^{+3} + OH^- + HO\cdot$$

Although such a free radical system is particularly suitable, and hence has been utilized for illustrating practice of this invention, it is not intended that the invention be limited thereto as use of other systems that form a free radical are contemplated for practice of the invention.

A particularly important aspect of this invention is the presence of a suitable solvent, such as a ketone, tertiary alcohol, and the like, for reaction of the conjugated diene in presence of chloride anions and a free radical as aforesaid.

As illustrated hereinafter, use of a suitable solvent and chloride anions in the system under the reaction conditions of this invention results in formation of the desired unsaturated dichloro derivatives corresponding to products of addition of two chlorine atoms to two diene units. Since free radical-forming oxidation-reduction reactions, such as the ferrous-peroxide system, takes place in aqueous solution, and as dienes such as butadiene are substantially water-insoluble, transfer of the free radicals to the butadiene phase is facilitated by use of a suitable solvent in the reaction system, effective reaction thereby occurring to yield the desired dichloro derivatives of the diene dimer.

The process embodied herein is particularly well adapted to use of butadiene as the diene, and hence, butadiene has been employed for illustrating the invention. However, also contemplated for use as the diene reactant are other aliphatic conjugated diolefins such as isoprene, dimethyl butadiene, the pentadienes, such as methyl-1,3-pentadiene, and the like.

Although it is not intended that the invention be bound by any theory as to the particular reactions that occur in the processing of conjugated dienes to produce the dichloro unsaturated derivatives as embodied herein, it is believed that the following reactions occur when, for illustrative purposes, the reactants include butadiene, the free radical is an OH· radical such as formed by oxidation-reduction reaction of hydrogen peroxide with a suitable metal salt (e. g., titanous chloride, ferrous chloride, etc.) and chloride anions are present in the mixture undergoing reaction.

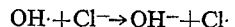
$$OH\cdot + Cl^- \rightarrow OH^- + Cl\cdot$$

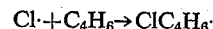
$$Cl\cdot + C_4H_6 \rightarrow ClC_4H_6\cdot$$

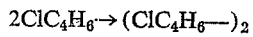
$$2ClC_4H_6\cdot \rightarrow (ClC_4H_6-)_2$$

With reference to the particular solvent employed, ketones and particularly monoketones, illustrated by acetone, are particularly adapted, and represent a preferred embodiment, for practice of the invention although other solvents, including tertiary alcohols, are contemplated for such use.

In order to illustrate the invention, without intent of limitation, specific embodiments thereof are set forth hereinafter.

*Example*

*Apparatus.*—A glass flask fitted with a stirrer, gas disperser, Dry Ice reflux condenser and two dropping funnels.

*Reactants.*—Titanous chloride as a 20% aqueous solution acidified with hydrochloric acid (1.5 mols HCl/mole of reductant metal salt), butadiene, a 30% aqueous solution of hydrogen peroxide, and acetone.

Acetone and a small amount of water were added to the flask and cooled by an external bath to a temperature of −10° C. A twofold excess of butadiene was passed through the disperser and condensed. The acidified titanous chloride solution was added to the contents in the flask through one of the dropping funnels and the hydrogen peroxide solution through the other funnel. The peroxide and metal salt solutions were added at a substantially similar rate, on a mole basis, at 0.3 mole per hour. An additional slow stream of butadiene was passed in during the reaction period amounting to about 20% of the butadiene initially added.

At the end of the reaction period, the reaction mixture separated into an oily layer and an aqueous layer. The oily layer was dissolved in ether, dried with magnesium sulfate, and distilled to yield a $C_4$ cut and a $C_8$ cut (48–54° C. at 0.05 mm. pressure). Whereas the $C_4$ cut was identified as containing 1,4-dichlorobutene and 1,2-dichlorobutene, the $C_8$ fraction gave the following elemental analysis:

|  | Percent C | Percent H | Percent Cl |
|---|---|---|---|
| Calculated for $C_8H_{12}Cl_2$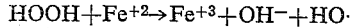 | 53.64 | 6.76 | 39.60 |
| Found | 52.43 | 6.60 | 40.45 |
|  | 52.64 | 6.75 | 40.50 |

Since butadiene may dimerize in units such as (a) RCH$_2$—CH=CH—CH$_2$· and (b)

the mixture of eight carbon atom dichloro unsaturated compounds produced by the process embodied herein comprises dichloro butadiene dimers formed by dimerization of two units of (a) whereby straight chain dichloro octadienes are formed, in mixture with either a dimer formed by one unit of (a) with one unit of (b), or by two units of (b), or both. In view of the narrow boiling range of the C$_8$ cut as described hereinbefore, and as the C$_8$ cut gave a weak vinyl (—CH=CH$_2$) absorption value in the spectrum, such a C$_8$ cut is apparently composed predominantly of straight chain products (dichloroocta- dienes) in mixture with isomeric material.

It is apparent from the foregoing that by the process described herein, a reaction is provided whereby a conjugated diene is converted to dichloro unsaturated derivatives corresponding to products of addition of two chlorine atoms to two units of the diene. That such formation of unsaturated dichloro diene dimers occurs is clearly evident from the foregoing analysis, which clearly establishes in chemical manner the identity of the unsaturated dichloro derivatives as embodied herein.

Preferably, the diene reactant is employed in amounts in excess so as to favor the dimerization thereof and formation of the desired dichloro products. On the other hand, less than a substantial excess of the diene may be employed in which case it is preferable, for minimization of undesired side reactions, to slowly add free radicals or free radical precursors and carry out the reaction at a relatively low rate of conversion of the diene. The maximum temperature employed is generally limited by the boiling point of the diene reactant although it is contemplated that carrying out the reaction under pressure is not precluded and in which case a temperature above the normal boiling point of the diene may be used. Hence, and although a temperature of —10° C. was used in the foregoing example, lower temperatures may be used although temperatures sufficiently low so as to induce freezing of the aqueous components of the reaction mixture should be avoided.

Although the process embodied herein is preferably carried out by concurrent addition to the reaction mixture, of the reductant (e. g., ferrous chloride) and peroxide (e. g., hydrogen peroxide) in substantially stoichiometric quantities, the process may be carried out by initial addition of the entire amount of either of the oxidation-reduction reactants. However, concurrent addition of such reactants is preferred so that an excess of the peroxide or a substantial excess of reductant metal ion is avoided in the reacting mixture to minimize undesired chain decomposition of the peroxide, or catalytic decomposition of the peroxide by the oxidized form of the metal ion or destruction of free hydroxyl radicals by the reductant metal ions. Hence, in preferred embodiment, the invention is carried out by addition of the reductant and peroxide at substantially similar rates and, as to addition of either in an excess over the other, it is preferred that the reductant metal ion be in slight excess over the peroxide.

In the production of the unsaturated dichloro derivatives of diene dimers as embodied herein, the reaction may be carried out using, in a ratio of equivalents, two of the diene (e. g., butadiene), one of the peroxide (e. g., hydrogen peroxide), and one of the reductant (e. g., ferrous chloride, titanous chloride, etc.) in a chloride anion-containing reaction mixture such as may be provided by acidifying the reductant solution with hydrochloric acid. Particularly suitable practice of the invention involves use of reductant metal salt solutions acidified with hydrochloric acid in a ratio of about one to about two mols of hydrochloric acid per mol of reductant. However, the invention may be practiced with reductant metal salt solution acidified with hydrochloric acid in amounts other than the aforesaid proportional amounts. Moreover, the invention may be carried out with use of somewhat different proportional amounts of the other reactants, and, for example, the diene may be used in amounts less than or greater than those aforesaid.

The dichloro products produced as described herein possess utility for many purposes and, particularly, as intermediates for synthesis of compounds, such as result by reaction of the dichloro unsaturated products embodied herein with potassium cyanide to produce dicyanides or mixtures of sebaco-nitriles, and hydrogenation of such nitriles to decanediamines useful in preparation of polyamides, such as those of the nylon type.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A process which comprises reacting a conjugated diene in the presence of a free radical, chloride anions and a solubilizing solvent for said diene whereby to produce a reaction mixture comprising a product corresponding to addition of two chlorine atoms to a dimer of said diene.

2. A process which comprises reacting an aliphatic conjugated diene in the presence of a free radical, chloride anions and a solubilizing solvent for said diene whereby to produce a reaction mixture containing a dichloro compound corresponding to addition of two chlorine atoms to two units of the diene, said reaction being carried out in liquid phase.

3. A process which comprises maintaining a reaction mixture of a conjugated diene and a ketone in liquid phase, and adding to the mixture a source of free radicals and chloride anions whereby to produce a reaction product containing a dichloro compound corresponding to addition of two chlorine atoms to a dimer of said diene.

4. A process which comprises maintaining a reaction mixture of a conjugated diene and a ketone in liquid phase, and adding to the mixture a source of chlorine ions and a source of free OH· radicals whereby to produce a dichloro compound corresponding to addition of two chlorine atoms to a dimer of said diene.

5. A process, as defined in claim 4, wherein the free radicals are provided in the reaction mixture by addition of a peroxide and an aqueous solution of a metal salt that undergoes oxidation-reduction reaction with the peroxide to form free radicals.

6. A process, as defined in claim 4, wherein the chloride ions are provided in the reaction mixture by addition of hydrochloric acid.

7. A process, as defined in claim 4, wherein the free radical is provided by addition to the reaction mixture of an aqueous solution of hydrogen peroxide and an aqueous solution, acidified with hydrochloric acid, of a metal salt that undergoes oxidation-reduction reaction with the peroxide to form a free radical in the reaction mixture.

8. A process which comprises maintaining a reaction mixture of butadiene and acetone in liquid phase, and adding to said mixture an aqueous solution of hydrogen peroxide and an aqueous solution, acidified with hydrochloric acid, of a metal salt that undergoes oxidation-reduction reaction with said peroxide to form a free radical in the reaction mixture whereby to produce a reaction product corresponding to addition of two atoms of chlorine to a dimer of butadiene.

9. A process which comprises maintaining a reaction mixture containing butadiene, acetone and water in liquid phase, and adding to said mixture an aqueous solution of hydrogen peroxide and an aqueous solution, acidified with hydrochloric acid, of a metal salt that undergoes oxidation-reduction reaction with said peroxide to form a free radical in said mixture whereby to produce a reaction product containing an isomeric mixture of dichloro compounds corresponding to addition of two chlorine atoms to two units of butadiene.

10. A process, as defined in claim 9, wherein the metal salt is titanous chloride.

11. A process, as defined in claim 9, wherein the peroxide solution and metal salt solution are added concomitantly in substantially stoichiometric quantities.

12. A process which comprises maintaining a reaction mixture of butadiene, acetone and water in liquid phase, adding to the mixture an aqueous solution of hydrogen peroxide and an aqueous solution of titanous chloride, said titanous chloride solution having been acidified with hydrochloric acid, and said solutions being added to the reaction mixture concomitantly and in substantially stoichiometric quantities, whereby to produce a reaction product comprising an oily layer and an aqueous layer, and separating from the oily layer a dichloro compound corresponding to addition of two chlorine atoms to two units of butadiene.

13. A process, as defined in claim 12, wherein the reactants are employed, in a ratio of equivalents, of two of butadiene, one of the peroxide and one of titanous chloride, and the titanous chloride solution is acidified with from about one to about two mols of hydrochloric acid per mole of titanous chloride.

14. As a new composition, an isomeric mixture of dichloro compounds corresponding to addition of two chlorine atoms to a dimer of a conjugated diene.

15. As a new composition, an isomeric mixture of dichloro compounds corresponding to addition of two chlorine atoms to a dimer of butadiene.

References Cited in the file of this patent

UNITED STATES PATENTS

| | | |
|---|---|---|
| 2,102,611 | Carothers et al. | Dec. 21, 1937 |
| 2,242,084 | Nicodemus et al. | May 13, 1941 |
| 2,267,712 | Bauer | Dec. 30, 1941 |
| 2,284,479 | Rust et al. | May 26, 1942 |
| 2,422,252 | Otto | June 17, 1947 |

OTHER REFERENCES

Miall et al.: A New Dictionary of Chemistry, page 418, 2nd edition, 1949, Longmans, Green and Co., New York, N. Y.